United States Patent Office 2,720,499
Patented Oct. 11, 1955

2,720,499

RUBBER-CARBON BLACK TREATMENT

Kenneth W. Doak, Bloomfield, N. J., assignor to United States Rubber Company, New York, N. Y., a corporation of New Jersey No Drawing. Application November 12, 1952,
Serial No. 320,149

5 Claims. (Cl. 260—41.5)

This invention relates to improvements in the technique of processing carbon black and rubber mixes prior to vulcanization thereof.

The technique of processing rubber mixes loaded with carbon black, prior to vulcanization thereof, whereby to obtain vulcanizates with improvements in physical and chemical properties, is described in Gerke et al. U. S. Patent 2,118,601. The improved vulcanizates prepared by the technique of Gerke et al. differ from the usual vulcanizates produced by older techniques in that they have relatively (1) lower modulus at low elongation, (2) higher modulus above 300% elongation, (3) higher resistance to abrasion, (4) lower torsional hysteresis, and (5) higher electrical resistivity, and are (6) relatively softer.

The improved vulcanizates of Gerke et al. are obtained by incorporating uniformly in the rubber a relatively large amount of carbon black, for example, at least 25 parts, and preferably in the case of tire treads at least 40 parts, by weight of carbon black per 100 parts by weight of rubber, and then subjecting the mixture to a heat treatment at a temperature substantially above 250° F., the preferred temperature being in the range from about 300° F. to 370° F., and masticating the mix during and/or after such heat treatment, or alternately therewith. The duration of the special heat treatment is varied with the temperature employed, the higher the temperature the shorter the time, and is governed also by the degree of change desired in the properties of the ultimate vulcanized product which properties are gauged to be compatible with its final use. In general, heat treatments of from 10 to 60 minutes duration are said to be suitable for most purposes, particularly within the preferred temperature range.

The principal object of the present invention is to provide a new chemical promoter for the processing of rubber-carbon black mixtures at relatively high temperatures as in processes of the general type disclosed in the above-mentioned Gerke patent, such processing often being referred to as low-hysteresis processing and usually being designed to produce high electrical resistance and low torsional hysteresis particularly in rubber stocks used for the manufacture of pneumatic tires and more particularly tread stocks. A further object is to bring about a substantial reduction in the time of such processing by the use of the herein disclosed chemicals whereby an important increase in the capacity and output of the equipment is obtained with the result that such processing is rendered more commercially feasible. Other objects and advantages of my invention will more fully hereinafter appear.

The present invention is based upon my discovery that hexachlorocyclopentadiene substantially decreases the time and/or lowers the temperature necessary for so-called low-hysteresis processing of rubber and carbon black mixes—that is, the rate of the low-hysteresis-processing reaction at a given temperature is materially increased.

The process of my invention comprises mixing natural rubber or a synthetic rubbery polymer of an aliphatic conjugated diolefin, i. e., an aliphatic conjugated diolefin polymer or copolymer, with a relatively large amount of a rubber-reinforcing carbon black and a relatively small amount of hexachlorocyclopentadiene, and heating this mixture at a temperature above 275° F. at which the rubber is not harmed, to bring about the desired changes in the rubber and carbon black mixture. Following the heat treatment, the vulcanizing and other desired compounding ingredients including conventional accelerators and the like are intimately incorporated in the conventional manner after which the mixture is shaped and vulcanized in the usual way.

Any carbon black which is capable of reinforcing the rubber can be used in the practice of my invention. I usually use either a furnace black or a channel black. Those skilled in the art will appreciate that the type of black is often selected with reference to the particular rubber employed. The amount of carbon black present during the heat treatment should be equal to at least 25 parts per 100 parts by weight of rubber. Preferably the amount of carbon black is equal to at least 40 parts per 100 parts of rubber, the use of such high proportions of carbon black being particularly desirable in the case of tread stocks. The amount of carbon black present during the heat treatment can be as much as 100 parts per 100 parts of rubber.

My invention can be practiced with natural rubber, e. g., Hevea rubber, and with those unsaturated synthetic rubbers which are sulfur-vulcanizable and are commonly considered to be equivalent to natural rubber or to display properties generally similar thereto, namely, polymers of aliphatic conjugated diolefins or mixtures of such diolefins with other unsaturated copolymerizable material. Examples of such polymers are synthetic rubbery polyisoprene and polybutadiene, and synthetic rubbery copolymers of butadiene or isoprene with such copolymerizable monomers as styrene, acrylonitrile, monovinylpyridines, methyl acrylate, methyl methacrylate, etc. I can even use "Butyl" rubber which, as is well-known, is a rubbery copolymer of a major proportion of isobutylene and a minor proportion of a multi-olefinic unsaturate having from 4 to 14 carbno atoms per molecule, the multi-olefinic unsaturate usually being an aliphatic conjugated $C_4$ to $C_6$ diolefin, typically isoprene or butadiene, the proportions usually ranging from 90 to 99.5% of isobutylene and correspondingly from 10 to 0.5% of the multi-olefinic unsaturate. By means of the chemical promoter of the present invention, it is possible to effect low-hysteresis processing of Butyl rubber and carbon black mixtures with outstanding success.

Hexachlorocyclopentadiene is preferably employed in an amount ranging from 0.5 to 3.0 parts per 100 parts of rubber. Amounts in this range so speed up the attainment of the desired effects of the heat treatment as to be commercially important. Amounts smaller than 0.5 part can be used but do not give the desired acceleration of the action of the heat treatment. Amounts greater than 3.0 parts can be used but are generally uneconomical. Since hexachlorocyclopentadiene is a relatively expensive chemical it is desirable to use as small an amount thereof as is consistent with an economically important acceleration in the effects of the heat treatment.

In the preferred practice of my invention the heat treatment of the mixture of rubber, carbon black and hexachlorocyclopentadiene is carried out by mastication at temperatures in the range 275°–400° F., using any suitable type of masticating equipment such as an open two-roll rubber mill or more preferably an internal rubber mixer, especially a Banbury mixer. The Banbury mixer is particularly advantageous because it exerts a severe masticatory action upon the charge and because it conserves the heat generated by the mixing action and this heat greatly aids in the elevation of the stock temperature to within the desired range. Depending upon the size and operating speed of the Banbury mixer and other factors, extraneous heat may or may not need to be applied to bring the stock temperature within the desired temperature range and to hold it there. If necessary or desired, extraneous cooling can be applied to keep the temperature from rising above a suitable level.

The optimum duration of the heat treatment at 275°–400° F. will vary depending upon many factors including the temperature of heat treatment, type of mixture, amount of hexachlorocyclopentadiene, etc. In any event it will be considerably shorter, at given temperature conditions, than the time required when the hexachlorocyclopentadiene is omitted. Times of the order of 5 to 15 minutes will generally be adequate for the purposes of my invention. It is well-known that different rubbers vary as to the highest temperatures they can withstand without harm.

It is preferable to form an intimate mixture of the rubber, carbon black and hexachlorocyclopentadiene at a relatively low temperature, i. e., not over 200° F., in order to avoid premature reaction of the hexachlorocyclopentadiene whereby its promoting effect upon the low hysteresis processing would be seriously reduced.

The following examples illustrate the preferred method of practicing my invention. All parts are by weight.

EXAMPLE 1

A masterbatch is prepared by mixing together 100 parts of natural rubber, 50 parts of carbon black (a medium processing channel black known commercially as "Spheron #6") and 5 parts of stearic acid. This mixing operation is carried out in the conventional manner in a Banbury mixer or a two-roll rubber mill. To equal portions of this masterbatch are added various amounts of hexachlorocyclopentadiene, on a two-roll rubber mill at a temperature below 275° F. The mill temperature is then raised to 300° F., and the mixture is masticated for 10 minutes. Thereafter, the mill is cooled to 150–200° F. and 2 parts of pine tar, 2 parts of zinc oxide, 1 part of antioxidant, 1 part of accelerator, and 3 parts of sulfur are incorporated. The mixture is placed in a suitable mold and vulcanized 45 minutes at 287° F. As a control, one portion of the masterbatch is subjected to all the previously described manipulative steps except that no hexachlorocyclopentadiene is added to the mixture. The specific electrical resistivity and torsional hysteresis are determined for the vulcanizates. The results are recorded in Table I.

Table I

| Stock No. | Parts of Hexachlorocyclopentadiene | Log Resistivity | Torsional Hysteresis (280° F.) |
| --- | --- | --- | --- |
| 1 | 2.7 | 13.0 | 0.052 |
| 2 | 1.5 | 13.0 | 0.050 |
| 3 | [1] 0.0 | 8.5 | 0.107 |
| 4 | 0.5 | 13.0 | 0.061 |
| 5 | 1.0 | 13.0 | 0.056 |
| 6 | 2.0 | 13.0 | 0.050 |
| 7 | [2] 0.0 | 7.8 | 0.132 |

[1] Control for 1, 2.
[2] Control for 4, 5, 6.

These data demonstrate the marked effect of hexachlorocyclopentadiene in increasing the specific electrical resistivity and reducing the torsional hysteresis of rubber containing carbon black.

EXAMPLE 2

A master batch is prepared by mixing in a conventional manner 100 parts of an isobutylene-isoprene copolymer (known commercially as "Butyl-15") and 50 parts of carbon black (a medium processing channel black, known commercially as "Spheron #6"). Various amounts of hexachlorocyclopentadiene are added to portions of the masterbatch, at a temperature below 275° F. The mixtures are then masticated at various high temperatures, in a Banbury mixer. Thereafter, 3 parts of stearic acid, 3 parts of zinc oxide, 1 part of tetramethylthiuram disulfide, 0.5 part of 2-mercaptobenzothiazole, and 2 parts of sulfur are incorporated on a two-roll mill at a temperature of 150–200° F. The stocks were vulcanized 60 minutes at 293° F. The data are summarized in Table II.

Table II

| Parts Hexachlorocyclopentadiene | Mastication | | Log Resistivity | Torsional Hysteresis, (280° F.) | ML-4 [1] (212° F.) |
| --- | --- | --- | --- | --- | --- |
| | Time (min.) | Temp., ° F. | | | |
| | 15 at 350 | | 6.6 | 0.191 | 75 |
| .5 | 15 at 350 | | 11.9 | .088 | 70 |
| 1.0 | 15 at 350 | | 13.0 | .070 | 69 |
| 1.5 | 15 at 350 | | 13.0 | .072 | 68 |
| 1.0 | 15 at 325 | | 9.6 | .099 | 70 |
| 1.5 | 15 at 375 | | 13.0 | .050 | 58 |

[1] Mooney viscosity of the stock after the high-temperature mastication but before the incorporation of vulcanizing ingredients; measured with the large rotor after 4 minutes' rotation.

These results show the marked effect of hexachlorocyclopentadiene in increasing the specific resistivity and decreasing the torsional hysteresis of Butyl rubber containing carbon black.

EXAMPLE 3

An experiment is carried out in a manner similar to Example 2, except that a furnace black (commercially known as "Philblack O") is used instead of "Spheron #6." The data are summarized in Table III.

Table III

| Parts Hexachlorocyclopentadiene | Mastication | | Log Resistivity | Torsional Hysteresis, (280° F.) | ML-4 (212° F.) |
| --- | --- | --- | --- | --- | --- |
| | Time (min.) | Temp., ° F. | | | |
| | 15 at 350 | | 3.2 | .230 | 81 |
| 0.5 | 15 at 350 | | 4.5 | .126 | 82 |
| 1.5 | 15 at 350 | | 9.4 | .101 | 69 |

These results show that hexachlorocyclopentadiene increases the specific electrical resistivity and decreases torsional hysteresis of Butyl rubber containing a furnace black.

EXAMPLE 4

To a masterbatch of 100 parts of a butadiene-styrene copolymer X-101 (a "cold" GR-S), 52 parts of carbon black (a medium processing channel black known commercially as "Spheron #6"), 6 parts of hydrocarbon oil ("Paraflux") and 1 part of stearic acid, hexachlorocyclopentadiene is added at a temperature below 275° F. The mixture is masticated in a Banbury mixer for 6 minutes at 325° F. Thereafter, 3 parts of zinc oxide, 0.35 part of antioxidant, 1 part of 2-mercaptobenzothiazole, 0.4 part of diphenylguanidine, and 2.0 parts of sulfur are incorporated on a two-roll rubber mill at 150–200° F. The mixture is vulcanized 45 minutes at 293° F. As a control, a stock was prepared in an identical manner except that no hexachlorocyclopentadiene was used. The data are recorded in Table IV.

Table IV

| Parts Hexachlorocyclopentadiene | Log Resistivity | Torsional Hysteresis (280° F.) |
| --- | --- | --- |
| 0.0 (Control) | 9.0 | 0.151 |
| 0.5 | 11.1 | .113 |
| 1.0 | 12.1 | .108 |
| 2.0 | 13.0 | .102 |

These results demonstrate the effectiveness of hexachlorocyclopentadiene in increasing the specific electrical resistivity and decreasing the torsional hysteresis of GR-S containing a channel black.

Although I have disclosed my invention with particular emphasis upon the preferred practice wherein the heat treatment is accompanied with mastication, nevertheless my invention can be practiced by carrying out the heat treatment under static conditions. For example, I may mix the rubber, carbon black and hexachlorocyclopentadiene to an intimate mixture in any suitable manner and then heat this mixture at 275°–400° F. without simultaneously masticating it, the heat-treated mixture being subsequently masticated and compounded with conventional compounding and vulcanizing ingredients. The static heat treatment may be conducted by placing slabs of the stock in an oven heated to a suitable temperature, or slabs of the hot stock can be stacked up and allowed to stand in the atmosphere for several hours, preferably under relatively non-heat-conductive conditions in order to maintain the mixture at the temperature of 275°–400° F. for as long as reasonably possible. If desired, the slabs can be wrapped with a suitable insulating blanket to cause prolonged retention of heat. Such static heat treatment has the advantage of releasing the Banbury equipment from use for carrying out the heat treatment and this may be desirable under certain conditions.

The electrical resistivity values given in the above examples were determined by measuring the resistance of a specimen of known thickness (about 0.1 inch) placed between mercury electrodes, under a potential difference of 135 volts, using a sensitive galvanometer with an Ayrton shunt. The logarithm (to base 10) of the specific electrical resistivity (ohm-cms.) is designated "Log resistivity."

The torsional hysteresis figures represent the logarithmic decrement (to base 10) of the observed amplitudes of successive oscillations of a torsion pendulum, measured at 280° F. with an apparatus consisting essentially of a torsion pendulum in which the sample of rubber tested supplies the restoring force when the pendulum is deflected. For further description of this test see Gerke et al., 2,118,601.

Having thus described my invention what I claim and desire to secure by Letters Patent is:

1. A process which comprises mixing rubber selected from the group consisting of natural rubber, synthetic rubbery aliphatic conjugated diolefin polymers and synthetic rubbery copolymers of aliphatic conjugated diolefins and other unsaturated copolymerizable material wtih a relatively large amount of rubber-reinforcing carbon black and from 0.5 to 3.0 parts of hexachlorocyclopentadiene per 100 parts of said rubber, heating the mixture at a temperature above 275° F., at which the rubber is not harmed, thereafter incorporating vulcanizing and other desired ingredients, shaping the mass, and vulcanizing the resulting shaped mass.

2. A process which comprises mixing rubber selected from the group consisting of natural rubber, synthetic rubbery aliphatic conjugated diolefin polymers and synthetic rubbery copolymers of aliphatic conjugated diolefins and other unsaturated copolymerizable material with a relatively large amount of rubber-reinforcing carbon black and from 0.5 to 3.0 parts of hexachlorocyclopentadiene per 100 parts of said rubber, masticating the mixture at a temperature of from 275° to 400° F., thereafter incorporating vulcanizing and other desired ingredients, shaping the mass, and vulcanizing the resulting shaped mass.

3. A process which comprises mixing natural rubber with a relatively large amount of a rubber-reinforcing carbon black and from 0.5 to 3.0 parts of hexachlorocyclopentadiene per 100 parts of said rubber, masticating the mixture at a temperature of from 275° to 400° F., thereafter incorporating vulcanizing and other desired ingredients, shaping the mass, and vulcanizing the resulting shaped mass.

4. A process which comprises mixing a rubbery copolymer of isobutylene and a multi-olefinic unsaturate with a relatively large amount of a rubber-reinforcing carbon black and from 0.5 to 3.0 parts of hexachlorocyclopentadiene per 100 parts of said rubbery copolymer, masticating the mixture at a temperature of from 275° to 400° F., thereafter incorporating vulcanizing and other desired ingredients, shaping the mass, and vulcanizing the resulting shaped mass.

5. A process which comprises mixing a rubbery butadiene-styrene copolymer with a relatively large amount of rubber-reinforcing carbon black and from 0.5 to 3.0 parts of hexachlorocyclopentadiene per 100 parts of said rubbery copolymer, masticating the mixture at a temperature of from 275° to 400° F., thereafter incorporating vulcanizing and other desired ingredients, shaping the mass, and vulcanizing the resulting shaped mass.

References Cited in the file of this patent

UNITED STATES PATENTS

| | | |
|---|---|---|
| 2,315,850 | Gerke | Apr. 6, 1943 |
| 2,478,036 | Baum | Aug. 2, 1949 |
| 2,504,295 | Beaver | Apr. 18, 1950 |
| 2,567,135 | Sturgis et al. | Sept. 4, 1951 |
| 2,598,561 | Kleiman | May 27, 1952 |